United States Patent [19]

Hendry

[11] Patent Number: 5,324,189

[45] Date of Patent: Jun. 28, 1994

[54] APPARATUS FOR INJECTION MOLDING OF A PLASTIC ARTICLE HAVING A HOLLOW RIB

[75] Inventor: James W. Hendry, Brooksville, Fla.

[73] Assignee: Melea Limited, Southfield, Mich.

[21] Appl. No.: 53,991

[22] Filed: Apr. 26, 1993

Related U.S. Application Data

[62] Division of Ser. No. 826,865, Jan. 28, 1992, Pat. No. 5,225,141.

[51] Int. Cl.$^5$ ............................................. B29C 45/17
[52] U.S. Cl. ................................. 425/533; 264/328.8; 264/328.12; 264/328.13; 264/572; 425/546; 425/572; 425/573; 425/588
[58] Field of Search ............... 425/130, 555, 572, 573, 425/574, 588, 533, 546; 264/572, 328.8, 328.11, 328.12, 328.13

[56] References Cited

U.S. PATENT DOCUMENTS

| | | | |
|---|---|---|---|
| 4,101,617 | 7/1978 | Friederich | 264/155 |
| 4,781,554 | 11/1988 | Hendry | 425/130 |
| 4,855,094 | 8/1989 | Hendry | 264/328.12 |
| 5,028,377 | 7/1991 | Hendry | 264/572 |
| 5,044,924 | 9/1991 | Loren | 425/542 |
| 5,069,859 | 12/1991 | Loren | 264/572 |
| 5,090,886 | 2/1992 | Jaroschek | 264/328.13 |
| 5,098,637 | 3/1992 | Hendry | 264/328.13 |
| 5,204,051 | 4/1993 | Jaroschek | 264/328.13 |

Primary Examiner—Jay H. Woo
Assistant Examiner—Joseph Leyson
Attorney, Agent, or Firm—Brooks & Kushman

[57] ABSTRACT

Apparatus for injection molding a plastic article having a hollow rib portion utilizing a spill cavity. A process includes the steps of sequentially injecting fluent plastic and gas into a mold cavity having a space defining at least one wall portion of the article and a channel defining a rib portion of the article. A quantity of fluent plastic is initially injected to substantially fill the mold cavity. A charge of pressurized gas is then injected into the channel of the mold cavity to displace a portion of the still fluent plastic into the spill cavity which is flow coupled to the channel. Preferably, the thickness of the rib portion in cross section is at least twice as large as the thickness of the wall portion in cross section along the entire length of the rib portion. Also, preferably, the channel is tapered along its length. The rib portion may be either internal or external to the article.

4 Claims, 3 Drawing Sheets

APPARATUS FOR INJECTION MOLDING OF A PLASTIC ARTICLE HAVING A HOLLOW RIB

This is a divisional of copending application Ser. No. 07/826,865, filed on Jan. 28, 1992, now U.S. Pat. No. 5,225,141.

TECHNICAL FIELD

This invention relates to plastic injection molding and, more particularly, to plastic injection molding wherein an article having a hollow rib portion is produced thereby.

CROSS-REFERENCE TO RELATED PATENTS AND APPLICATIONS

This application is related to U.S. Pat. Nos. 4,781,554; 4,855,094; and 5,028,377 and U.S. patent application "Method and System for Localized Fluid-Assisted Injection Molding and Body Formed Thereby", Ser. No. 351,271 filed May 10, 1989 now U.S. Pat. No. 5,069,859, all of which have the same Assignee as the Assignee of the present invention and all of which are hereby incorporated by reference.

BACKGROUND ART

In the plastic injection molding art, the usual challenges facing a product designer are to design an article having requisite strength for the product application and uniform surface quality for satisfactory appearance, but to avoid excessive weight, material usage and cycle time. A design compromise must often be made between strength and plastic thickness. A relatively thicker plastic section in the article, such as a structural rib, will incur greater weight, material usage, cycle time and induce sink marks and other surface defects due to thermal gradients in the area of the thickened section.

It is known in the plastic molding art to use pressurized fluid in conjunction with the plastic molding of articles. The pressurized fluid is typically nitrogen gas which is introduced into the mold cavity at or near the completion of the plastic injection. The pressurized fluid serves several purposes. First, it allows the article so formed to have hollow interior portions which correspond to weight and material savings. Second, the pressurized fluid within the mold cavity applies outward pressure to force the plastic against the mold surfaces while the article solidifies. Third, the cycle time is reduced as the gas migrates through the most fluent inner volume of the plastic and replaces the plastic in these areas which would otherwise require an extended cooling cycle. Fourth, the gas pressure pushes the plastic against the mold surfaces, thereby obtaining the maximum coolant effect from the mold.

However, as the dimensions of the molded article increase, the gas must do more work to migrate through the volume of the mold cavity to assist in setting up the article within the cavity. If the pressure of the gas is too great as it enters the mold cavity, there is a risk that it may rupture or blow out the plastic within the mold cavity, i.e., the gas is not contained within the plastic. Thus, there have been practical limitations in the adaptation of gas injection in the plastic molding field.

It is important to ensure that the maximum gas flow length in a channel is obtained so that permeation, shadow marks or sinkage are minimized. It is known that as the gas enters the partially filled molding and urges the plastic forward or outward to fill the cavity, that the gas opening or openings created in the molding get progressively smaller the further we get from the gas entry port. This is illustrated in FIGS. 5 and 6. This can result in the gas channel not being completely filled with gas to the end of the channel. This can result in sinkage at the end of the channel.

One way to overcome this problem is to reduce the amount of plastic injected into the cavity. This leaves more room for gas. However, this could lead to another problem which is the permeation of the gas into the walls of the molding. Further reduction in weight could cause blowout of the gas and a nonfilled molding.

DISCLOSURE OF THE INVENTION

One aspect of the present invention is a method and apparatus for injection molding and a hollow plastic article formed thereby with pressurized gas which provides for displacement by the gas of a portion of plastic from a channel of the mold cavity into a flow coupled spill cavity. This feature enables a plastic article having a hollow reinforcing rib to be successfully molded with the advantages of established gas injection molding techniques.

More specifically, the process involves the initial injection of a quantity of fluent plastic into a mold cavity including a channel having a shape defining a rib portion of the plastic article to be molded. At or near the completion of the plastic injection, a charge of pressurized gas is introduced into the channel of the mold cavity to displace a portion of the still fluent plastic from the channel. The displaced plastic typically flows through a passage from the channel into a connected spill cavity or reservoir. In this way, a longer gas passage is formed in the rib portion. Preferably, the gas passage extends along substantially the entire length of the rib portion and has a substantially constant cross section therealong. The injected plastic is then permitted to solidify. The gas is vented from the mold cavity and the plastic article is removed from the mold.

Apparatus are also provided to perform the process.

The reservoir may alternatively serve as (i) an appendage of the complete article; (ii) a separate article; or (iii) a cavity to receive spilled plastic for regrinding. The plastic which is displaced is generally the hottest and most fluent. In this regard, the introduction of the charge of pressurized gas into the mold cavity can be timed to modulate the amount of plastic displaced, i.e., the longer the delay in introduction, the cooler and less fluent the plastic in the mold cavity.

Typically, a tapered rib or channel design is provided to eliminate sinkage while not producing permeation. Also, preferably, the center of mass of the rib where it joins the wall must produce a gas channel opening where the top of the gas opening leaves a wall equal to or significantly thicker than the surface wall thickness. This will substantially reduce the permeation and shadow marks.

The present invention admits to molding of thin-walled solid plastic articles having hollow reinforcing ribs for use in diverse product fields.

Other advantages and features of the present invention will be made apparent in connection with the following description of the best mode for carrying out the invention.

BEST MODE FOR CARRYING OUT THE INVENTION

Figure 1:
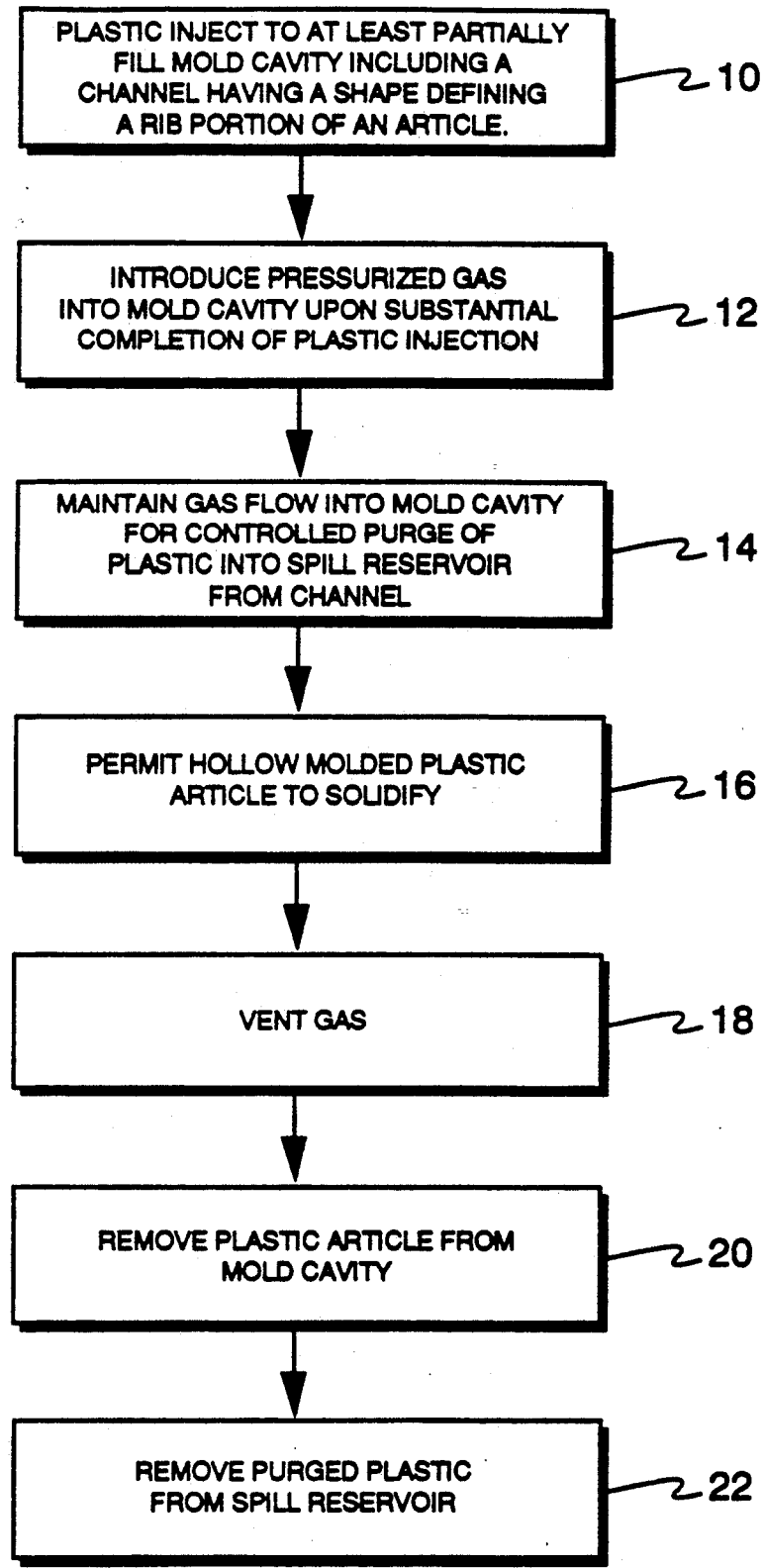
FIG. 1 is a flow chart indicating the basic steps involved in practice of the process of the present invention.

FIG. 1 is a flow chart of the steps involved in practicing the process of the present invention.

Figure 7:
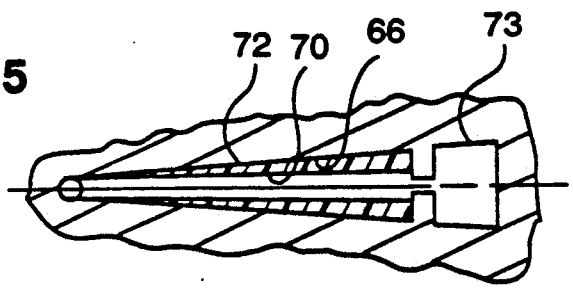
FIG. 7 is a side view, partially broken away and in cross section, of a mold cavity including a channel portion and a spill cavity in a mold.
Figure 8:
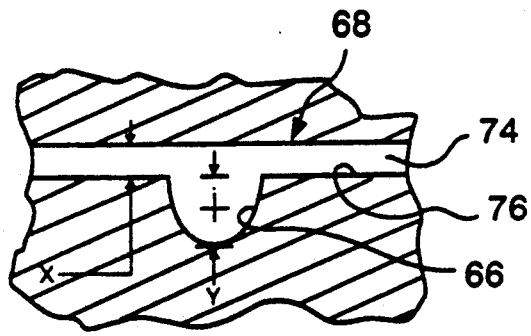
FIG. 8 is an end view of the channel portion and a space defining at least one wall portion of the article.

In step 10, a quantity of molten plastic is injected from an injection molding machine into a mold cavity. As best shown in FIGS. 7 and 8, the mold cavity of the present invention includes a channel having a shape defining a rib portion of the article to be molded. The plastic is any thermoplastic and works particularly well with glass or mineral filled thermoplastic polyester, commonly known by the trademark Valox of General Electric Company. The quantity is sufficient to provide the mass of the article to be molded, but desirably less than the quantity which would completely fill the mold cavity.

In step 12, a charge of pressurized gas is introduced into the mold upon substantial completion of the injection of the quantity of molten plastic.

In step 14, the gas flow into the mold is maintained in pressure and duration in amount and time sufficient to displace a controlled quantity of plastic from the channel of the mold cavity into a spill cavity which is flow coupled to the channel. The gas tends to displace the hottest, most fluent plastic in the central portion of the channel. Consequently, a rib portion of the molded plastic article has a hollow interior where the most viscous plastic has been displaced.

The presence of the gas affords savings in weight and material usage. Added benefits include enhanced surface quality due to the outward pressure exerted by the gas, reduced cycle time due to displacement of the relatively hot plastic from the central portion of the rib portion of the article and substantially strain free moldings.

In step 16, the article is permitted to solidify within the mold cavity while the internal gas pressure is maintained.

In step 18, the pressurized gas is vented from the interior of the rib portion of the molded article preparatory to opening the mold. Numerous ways of venting are possible such as described in the U.S. Pat No. 4,101,617 to Friederich, or as described in U.S. Pat. No. 4,781,554 noted above.

In step 20, the plastic article is removed from the mold.

In step 22, the purged or displaced plastic is removed from the spill cavity or reservoir. In certain cases, steps 20 and 22 can be the common operation of ejecting the moldings so formed from the article cavity and the spill cavity.

Figure 2:
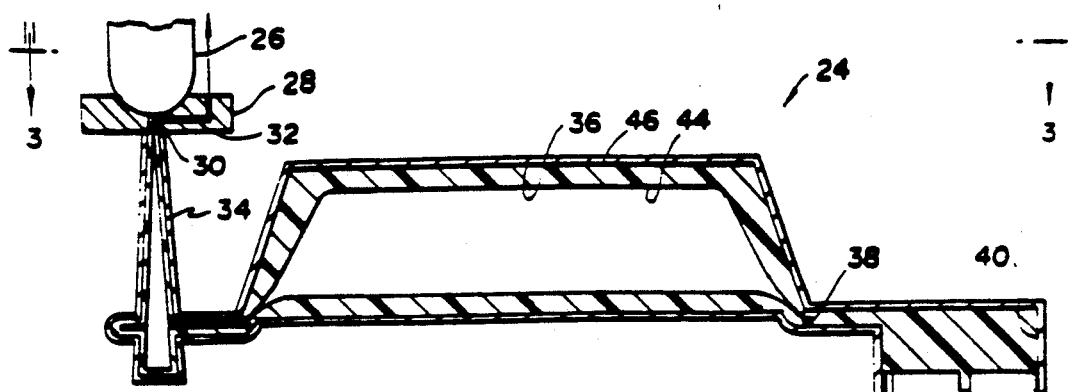
FIG. 2 is a schematic side view of a plastic injection molding apparatus adapted to carry out the process of the parent application as well as the present invention.
Figure 3:
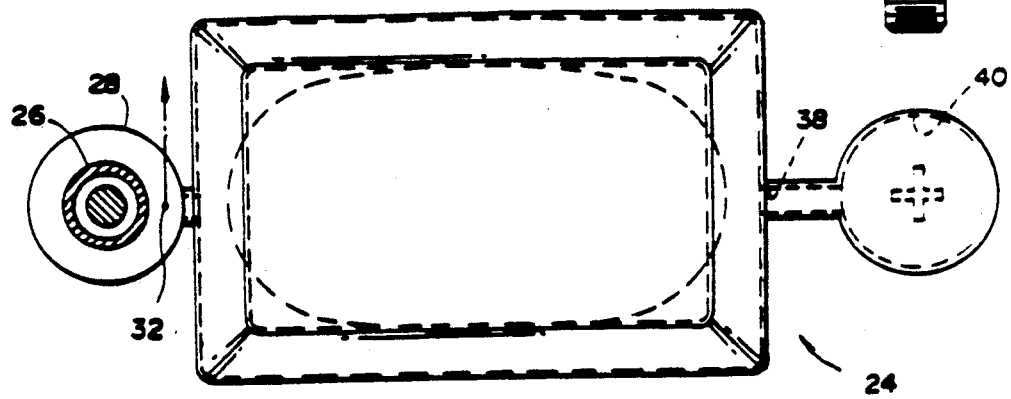
FIG. 3 is a top plan view of the apparatus of FIG. 2.

FIGS. 2 and 3 are schematic side and plan views, respectively, of a plastic injection molding apparatus, generally indicated at 24, adapted to carry out the process of the parent application as well as the present invention.

A nozzle 26 of the plastic injection molding machine is brought into registering position with a modified sprue bushing 28 associated with a mold. The sprue bushing 28 may be of the type disclosed in the above-noted U.S. Pat. No. 4,855,094. The sprue bushing 28 has a plastic flow path 30 formed at its center to permit the passage of molten plastic through a sprue 34 into a mold cavity 36.

The modified sprue bushing also includes a gas path 32 to permit the introduction and venting of a charge of pressurized gas.

The mold cavity 36 is flow coupled through a runner segment 38 to a spill cavity 40. The volume of the spill cavity 40 may be varied by any well-known means to control the quantity of displaced plastic such as by a lead screw 42.

A molded article 46 includes an interior void 44 formed by the presence and influence of the pressurized gas. The spill cavity 40 may be formed to mold an integral appendage of the article 46, or a separate article, or simply scrap for regrinding.

Figure 4:
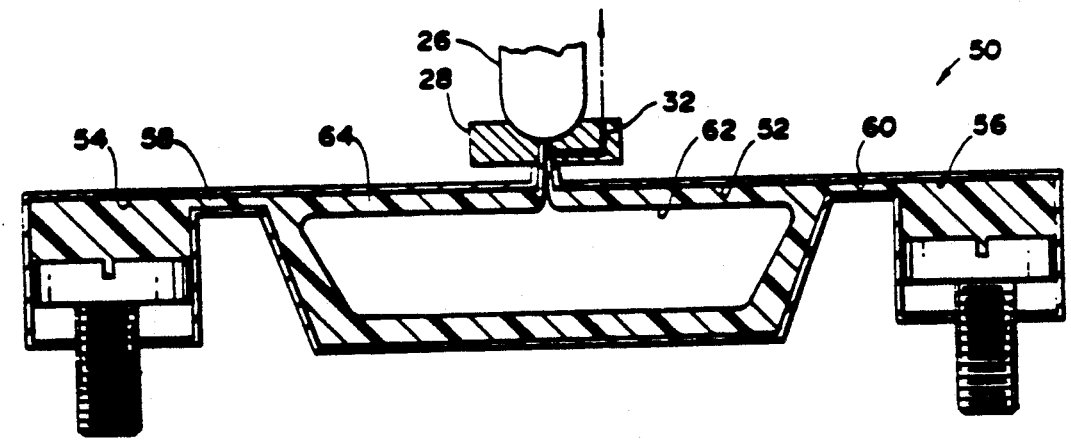
FIG. 4 is another schematic view of a plastic injection molding apparatus illustrating an alternative arrangement for practicing the process of the parent application as well as the present invention.

FIG. 4 is another schematic view of a plastic injection molding apparatus, generally indicated at 50, illustrating an alternative arrangement for practicing the process of the parent application as well as the present invention. In this case, the apparatus 50 employs first and second spill cavities 54 and 56 which are flow coupled through runners 58 and 60, respectively, to a mold volume 52. Again, a nozzle 26 from an injection molding machine registers with the sprue bushing 28 to inject a quantity of molten plastic into the mold cavity. A charge of pressurized gas flows along the gas path 32 in the modified sprue bushing 28 and into the cavity 52 to displace the most viscous plastic from the mold cavity 52 into the first and second spill cavities 54 and 56. This process, when performed in accordance with the steps of FIG. 1, will yield a molded article 64 having a central void 62 due to the displacement of plastic by the pressurized gas.

Figure 5:
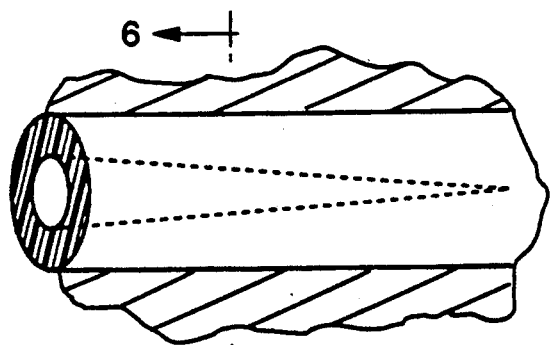
FIG. 5 is a side view, partially broken away and in cross section, illustrating a hollow article formed by a prior art gas-assisted process.
Figure 6:
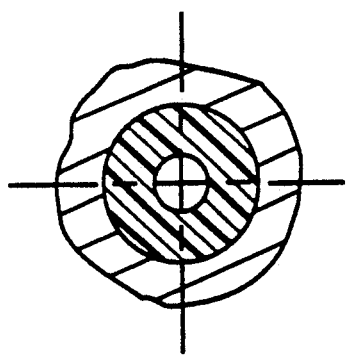
FIG. 6 is a sectional view taken along lines 6—6 in FIG. 5 of the moulding.

FIG. 7 is a schematic view of tapered channel 66 of a mold cavity, generally indicated at 68 in FIG. 8. The channel 66 helps to overcome the resulting sinkage problem illustrated in FIGS. 5 and 6 by being tapered outwardly toward the spill cavity of FIG. 7 sufficient to permit the charge of pressurized gas to travel substantially the entire length of the channel 66. In the example of FIG. 7, the angle is 0.25 degrees. The angle will vary depending on the type of plastic injected, the pressure of the gas in the channel, the dimensions of the channel, etc.

A gas passage 70 which has a relatively uniform diameter is formed in a plastic rib portion 72 of the article. A spill cavity 73 receives molten plastic from the channel 66 during gas flow into the channel 66.

The mold cavity 68 also includes a space 74 which defines at least one solid wall portion of the article and which is flow coupled to the channel. The channel 66 extends from a bottom surface 76 of the mold which also defines the bottom surface of the solid wall portion of the article. The thickness of the channel 66, y, is preferably at least twice as large as the thickness of the space, x, along the entire length of the channel 66 so that the thickness of the solid wall portion of the article immediately above the rib portion 72 is substantially equal to the thickness of the rest of the solid wall portion of the article. This feature substantially eliminates permeation and sinkage marks in the top surface of the article immediately above the rib portion 72.

Figure 9:
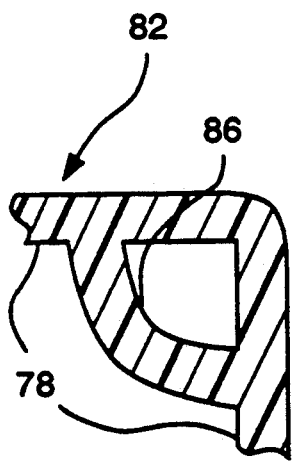
FIGS. 9 and 10 are end views, partially broken away and in cross section, which interconnect two adjacent wall portions and which illustrate two types of internal rib configurations.
Figure 10:
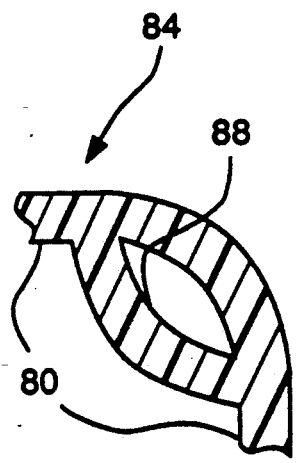

FIGS. 9 and 10 show wall portions 78 and 80 of articles, generally indicated at 82 and 84, respectively, which have interconnecting internal rib portions 86 and 88, respectively. The space of the mold cavities defines the wall portions 78 and 80 of the articles 81 and 84, respectively. In turn, the internal rib portions 86 and 88 interconnect the wall portions 78 and 80, respectively.

Preferably, the quantity of fluid plastic is pressurized and the process further includes the step of depressurizing the plastic after plastic injection to facilitate the displacement of plastic from the channel to the spill cavity 73. This depressurization step is best described in the above-noted U.S. Pat. No. 5,028,377.

The invention has been described in illustrative embodiments, but it will be evident to those skilled in the art that variations may be made from the foregoing teachings without departing from the scope of the following claims.

What is claimed is:

1. Apparatus for injection molding a hollow plastic article, the apparatus comprising:
    a mold having a mold cavity including a channel having a shape defining a rib portion of the article and a spill cavity coupled to the channel;
    means for injecting a quantity of fluid plastic into the mold cavity; and
    means for introducing a charge of pressurized gas into the channel of the mold cavity to displace a portion of the plastic from the channel of the mold cavity into the spill cavity to thereby form a gas passage in the rib portion wherein the channel is tapered outwardly toward the spill cavity at an angle sufficient to permit the charge of pressurized gas to travel substantially the entire length of the channel to form the gas passage so that the gas passage is substantially uniform in cross section along the entire length of the gas passage.

2. The apparatus of claim 1 wherein the mold cavity includes a space defining at least one solid wall portion of the article wherein the space is coupled to the channel and wherein the thickness of the channel in cross section is at least twice as large as the thickness of the space in cross section along the entire length of the channel so that the thickness of the solid wall portion connected to the rib portion is substantially equal to the thickness of the rest of the solid wall portion.

3. The apparatus of claim 1 wherein the angle is substantially 0.25 degrees.

4. The apparatus of claim 1 wherein the apparatus further comprises means for depressurizing the fluid plastic to facilitate the displacement of the portion of plastic into the spill cavity.

* * * * *